US008825964B1

(12) United States Patent
Sopka et al.

(10) Patent No.: US 8,825,964 B1
(45) Date of Patent: Sep. 2, 2014

(54) ADAPTIVE INTEGRATION OF CLOUD DATA SERVICES WITH A DATA STORAGE SYSTEM

(75) Inventors: John R. Sopka, Groton, MA (US);
Patrick Brian Riordan, Newton, MA (US); David Meiri, Cambridge, MA (US); Yigal Banker, Chestnut Hill, MA (US); John T. Fitzgerald, Mansfield, MA (US); Alex Veprinsky, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 402 days.

(21) Appl. No.: 13/200,569

(22) Filed: Sep. 26, 2011

(51) Int. Cl.
*G06F 12/00* (2006.01)
*G06F 9/44* (2006.01)
*G06F 3/06* (2006.01)

(52) U.S. Cl.
CPC ............ *G06F 3/0671* (2013.01); *G06F 3/061* (2013.01); *G06F 3/0647* (2013.01); *G06F 3/0655* (2013.01); *G06F 9/44* (2013.01)
USPC .................. 711/152; 711/E12.001; 717/173; 717/178

(58) Field of Classification Search
CPC ........................................................ G06F 9/52
USPC ......... 711/152, 100, 110–112, 154, 156, 165, 711/167; 717/171, 174; 709/218–219, 203; 718/1, 105
See application file for complete search history.

(56) References Cited

U.S. PATENT DOCUMENTS 7,461,374 B1 * 12/2008 Balint et al. .................. 717/174
7,475,206 B2 * 1/2009 Murotani et al. ............. 711/162

OTHER PUBLICATIONS

Oracle, "Oracle Exadata Database Machine", Aug. 3, 2011, 1 Page, http://www.oracle.com/us/products/database/exadata-database-machine/index.html.
Oracle, "A Technical Overview of the Sun Oracle Exadata Storage Server and Database Machine", An Oracle White Paper, Sep. 2009, 29 Pages.
Jerome J. Cartmell, et al., U.S. Appl. No. 12/798,035, filed Mar. 29, 2010.

* cited by examiner

*Primary Examiner* — Denise Tran
(74) *Attorney, Agent, or Firm* — Muirhead and Saturnelli, LLC

(57) ABSTRACT

Described are techniques for performing processing in a data storage system. A client application executing on a host is identified as a candidate for migration to the data storage system. First data used by the client application is stored on one or more physical storage devices of the data storage system. The client application is migrated to the data storage system for temporary execution on the data storage system. The client application is executed on the data storage system for a time period using a first portion of resources of the data storage system allocated for exclusive use by migrated client applications executing on the data storage system.

18 Claims, 13 Drawing Sheets

| | Minimum | Target | Maximum |
|---|---|---|---|
| Application 1 | 10 | 30 | 60 |
| Application 2 | 30 | 40 | 70 |
| Application 3 | 20 | 30 | 50 |

FIG. 11

ADAPTIVE INTEGRATION OF CLOUD DATA SERVICES WITH A DATA STORAGE SYSTEM

BACKGROUND

1. Technical Field

This application generally relates to data storage systems, and more particularly to adaptive techniques for efficient resource utilization.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of tasks and operations using the data storage system. For example, a host processor may perform I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share the physical storage media and other physical resources of the data storage system whether or not they share the data stored therein.

An application executing on the host may perform an operation using data stored on the data storage system. The host may be connected to the data storage system over an interconnect fabric. In general terms, performing the host operation may include the host requesting and obtaining data from the data storage system, the host processing the acquired data, and the host transferring any output data as a result of the host processing to the data storage system and possibly to an end user or requester of the operation. An I/O request by the host to read data on the storage system requires a communication exchange between the host and data storage system whereby the data storage system obtains the requested read data from data storage device(s) and transfers the data to the host. An I/O request by the host to write data to the storage system requires a communication exchange between the host and data storage system whereby the host sends the data to be written to the data storage system and the data storage system then writes the data to the physical data storage device(s). The data storage system may perform caching of the foregoing read data and write data and may store such data in cache in connection with servicing received I/O requests.

SUMMARY OF THE INVENTION

In accordance with one aspect of the invention is a method for performing processing in a data storage system comprising identifying a client application executing on a host as a candidate for migration to the data storage system, wherein first data used by the client application is stored on one or more physical storage devices of the data storage system; migrating the client application to the data storage system for temporary execution on the data storage system; and executing the client application on the data storage system for a time period using a first portion of resources of the data storage system allocated for exclusive use by migrated client applications executing on the data storage system. The first portion of resources may include any of a processor of the data storage system that executes code, memory of the data storage system, and an amount of bandwidth of an external communications port that communicates with the host. The client application may be identified using one or more criteria. The criteria may include any of a ratio of an amount of data read for performing a first operation to an amount of data output as a result of performing the first operation on the data read, a ratio of an amount of time for the host to obtain data from the data storage system for performing an operation to an amount of time the client application takes to perform the operation on the obtained data, and whether the client application performs sequential data accesses of at least a specified size. The method may also include determining whether to migrate the client application in accordance with current utilization of one or more resources of the data storage system. The current utilization may be utilization of a processor of the data storage system. The current utilization may be utilization of memory. The current utilization may be utilization of a component of the data storage system. The client application may execute in a virtual machine in a virtualized environment on the host and also on the data storage system. The step of migrating may include migrating a first virtual machine of the host to a second virtual machine of the data storage system. The client application may execute on a first processor of a front end adapter of the data storage system and wherein said front end adapter may communicate with components external with respect to the data storage system and may receive I/O requests from the host. The first portion of resources allocated for exclusive use by the migrated client applications may include the first processor allocated for exclusive use by the migrated client applications and a portion of memory allocated for private exclusive use by the front end adapter, where the first processor may be one of a plurality of processors of the front end adapter. The method may include determining whether to migrate the client application executing on the data storage system back to the host for execution on the host rather than the data storage system. The resources may include memory of the data storage system and a first set of thresholds may include a first minimum, first target and first maximum for the client application and a second set of thresholds may include a second minimum, second target and second maximum for a second application that is not a migrated client application. The client application may be allocated an amount of memory greater than said first target only if the second application is currently not allocated an amount of memory greater than the second target. The second application may perform processing to service received I/O operations from the host or another external client connected to the data storage system. The steps of identifying, migrating and executing may be performed automatically in response to a defined policy. While the client application is executing on the data storage system, the client application may access first data to perform an operation and may send a result of the operation to the host. The first portion of resources may be dynamically determined and may change with respect to workload of the client application and workload of other tasks performed on the data storage system for non-migrated applications. The client application may not execute in a virtual machine of a virtualized environment on the host and may execute in a virtual machine of a virtualized environment on the data storage system. The client application may execute on a processor of a back end adapter of the data storage system and the back end adapter may directly access one or more physical storage devices in connection with performing data reads and writes for processing received I/O requests from the host.

In accordance with another aspect of the invention is a computer readable medium comprising executable code store thereon for performing processing in a data storage system, the computer readable medium comprising code for: identifying a client application executing on a host as a candidate for migration to the data storage system, wherein first data used by the client application is stored on one or more physical storage devices of the data storage system; migrating the client application to the data storage system for temporary execution on the data storage system; and executing the client application on the data storage system for a time period using a first portion of resources of the data storage system allocated for exclusive use by migrated client applications executing on the data storage system.

BRIEF DESCRIPTION OF THE DRAWINGS

Features and advantages of the present invention will become more apparent from the following detailed description of exemplary embodiments thereof taken in conjunction with the accompanying drawings in which:

FIG. 11 is an example of resource thresholds that may be used in connection with a defined policy of the data storage system in an embodiment in accordance with techniques herein.

DETAILED DESCRIPTION OF EMBODIMENT(S)

Figure 1:
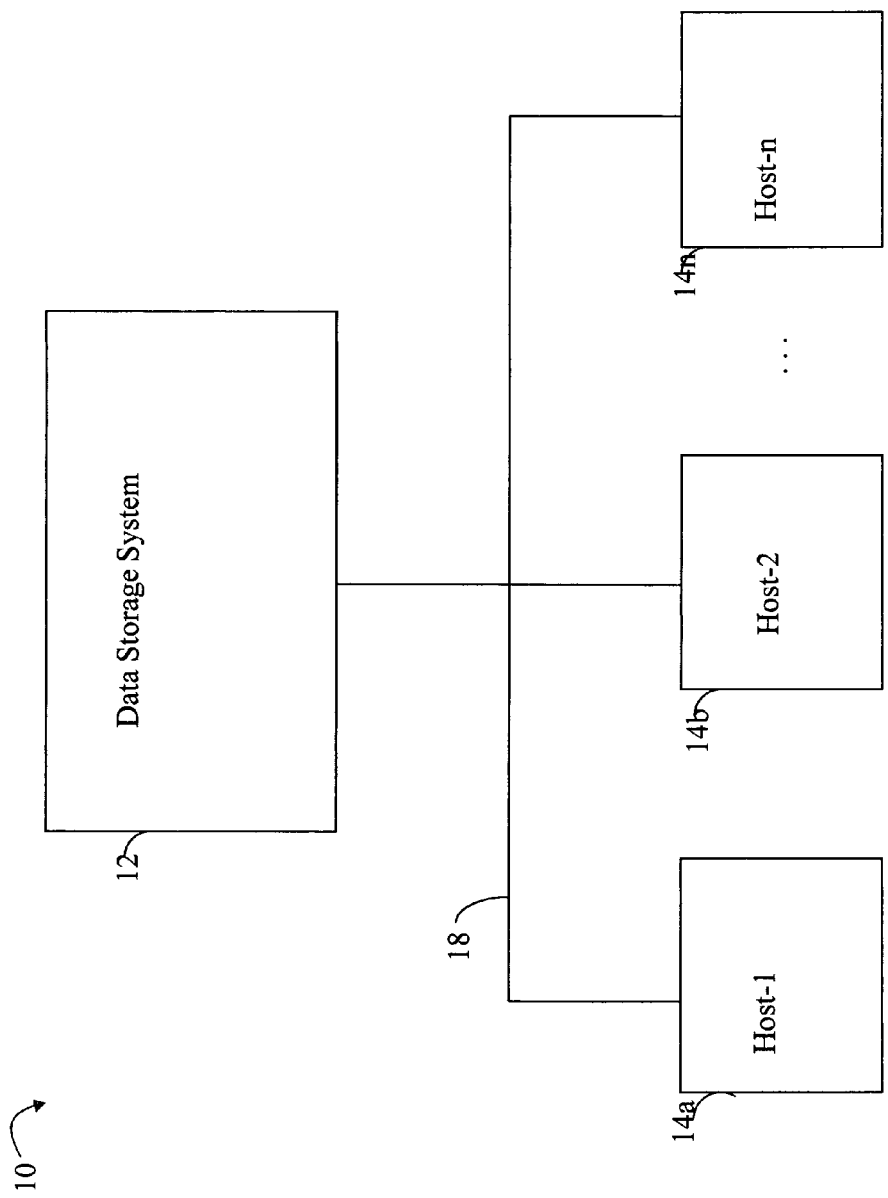
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, or iSCSI, Fibre Channel over Ethernet, and the like. Some or all of the connections by which the hosts and data storage system 12 may be connected to the communication medium 18 may pass through other communication devices, such as switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well as one or more other data storage systems as may vary with the embodiment.

Figure 2A:
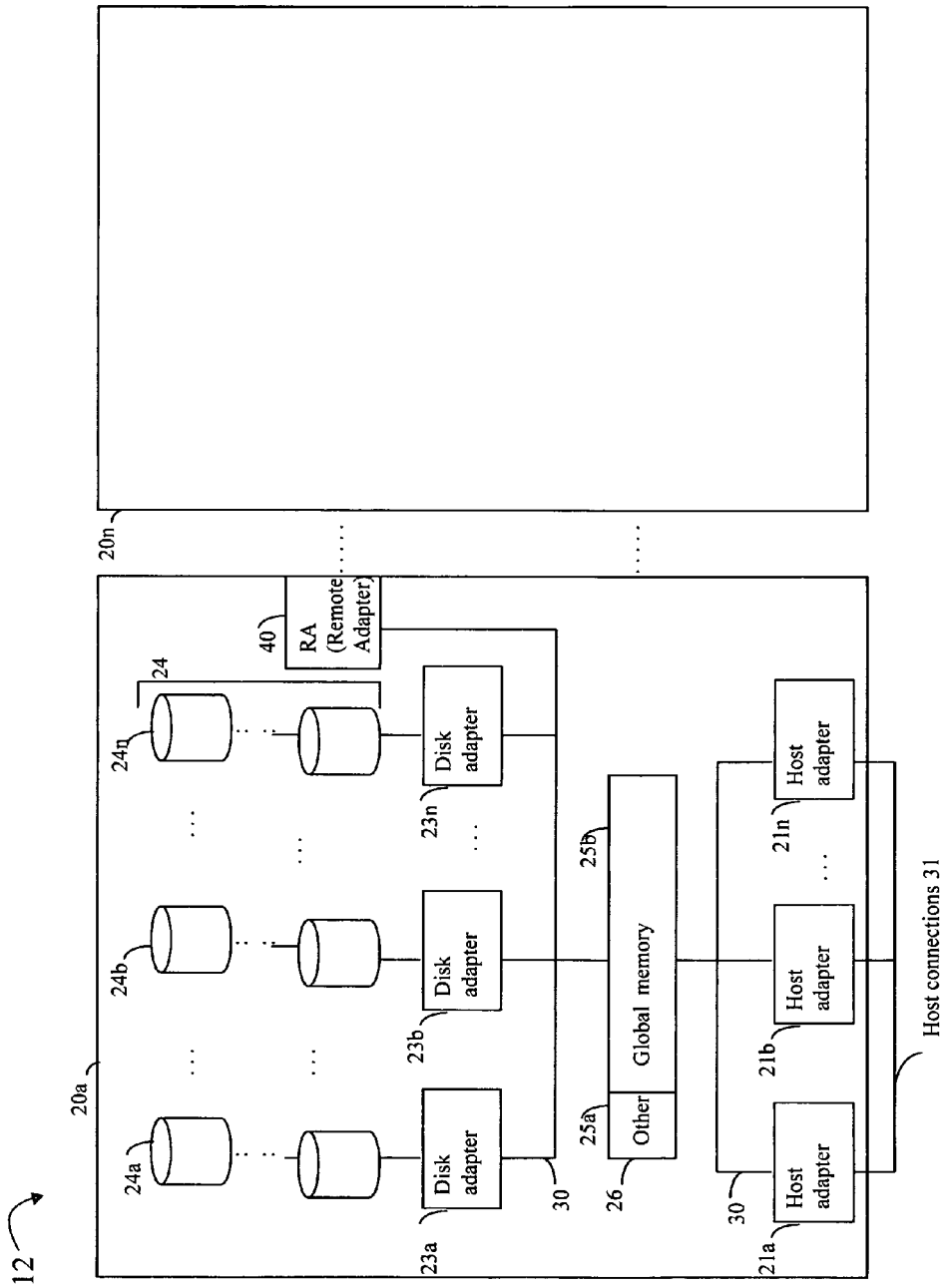
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. In one embodiment, the data storage systems 20a-20n may be data storage arrays such commercially available from by EMC Corporation of Hopkinton, Mass. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate standalone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may perform operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a back-end component, such as a DA. In connection with data storage systems such as by EMC Corporation, various types of directors or adapters may be implemented as a processor, or, more generally, a component that includes one or more processors. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units also referred to as LUNs (logical unit numbers). The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon. A LUN or logical unit number may be characterized as a disk array or data storage system reference to an amount of disk space that has been formatted and allocated for use to one or more hosts.

The DA performs I/O operations on a disk drive. Data residing on a LUN may be accessed by the DA following a data request in connection with I/O operations that other directors originate such as an FA that receives a request from a host.

Figure 2B:
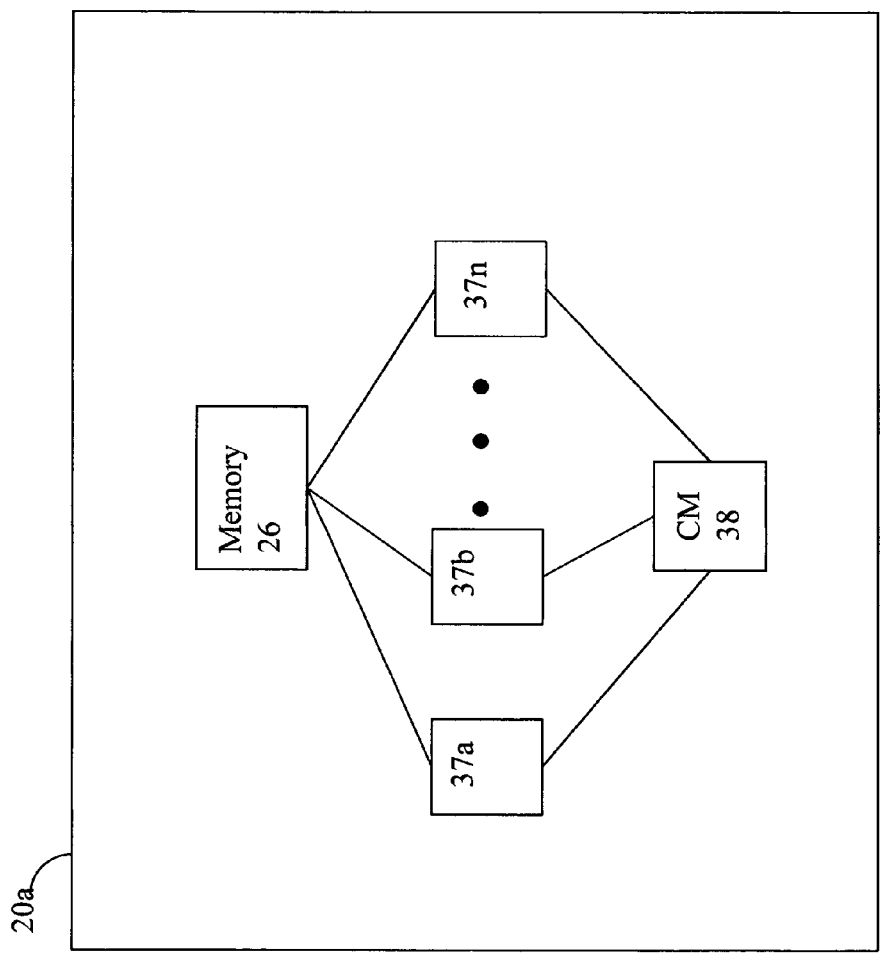
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be multiple directors coupled to the memory 26 with a particular limit that may vary with embodiment. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

An application executing on the host may perform an operation using data stored on the data storage system. The host may be connected to the data storage system over an interconnect fabric. In general terms, performing the host operation may include the host requesting and obtaining data from the data storage system, the host processing the acquired data, and the host transferring any output data as a result of the host processing to the data storage system and possibly to an end user or requester of the operation. An I/O request by the host to read data on the storage system requires a communication exchange between the host and data storage system whereby the data storage system obtains the requested read data from data storage device(s) and transfers the data to the host. An I/O request by the host to write data to the storage system requires a communication exchange between the host and data storage system whereby the host sends the data to be written to the data storage system and the data storage system then writes the data to the physical data storage device(s). The data storage system may perform caching of the foregoing read data and write data and may store such data in cache in connection with servicing received I/O requests.

Some applications executing on the host may have a workload that may be characterized as data intensive in that, for example, it accesses (e.g., reads) large amounts of data from the data storage system when performing its processing. The resources and amount of time (e.g., elapsed time such as contributing to overall response time) utilized in connection with transfer of the data between the host and data storage system may be characterized as overhead or costs associated with the transfer and acquisition of the data used by the host. For data intensive applications, the amount of time and resources expended with communications between the host and data storage system to acquire the data from and/or store the data on the data storage system may be relatively high when compared to the amount of time and resources expended on the host by the executing application when processing the acquired data.

Costs associated with performing an operation by an application executing on the host may be expressed in terms of resources expended and/or elapsed time. The costs incurred to perform the operation may include a first cost and a second cost. The first cost for the operation may be associated with data transfer costs for the transfer of data between the host and data storage system. The second cost for the operation may be measured in terms of the amount of resources and/or elapsed time expended by the host in processing the data obtained from the data storage system. Performance benefits may be obtained by the data storage system, host, and overall system using techniques described in more detail below in which selected host applications, or more generally client applications, having their data stored on the devices of the data storage system are migrated for execution on the data storage system rather than the host. For such client applications when executing on the data storage system, data transfer overhead such as when acquiring input data used by the application may be greatly reduced since the requested data and client application are both resident on the same data storage system thereby eliminating the need to transfer such input data over a connection between the data storage system and the host. In accordance with techniques herein, resources of the data storage system may be partitioned for use between the migrated client applications executing on the data storage system and other tasks performed by the data storage system in connection with its own processing and servicing of received data requests (e.g., tasks other than those of the migrated client application). Furthermore in accordance with techniques herein, dynamic processing capabilities may be provided thereby enabling a flexible utilization of physical resources of the data storage system, host, and network or other connection fabric therebetween. Migrated applications are provided with direct or local access to their data on the data storage system upon which the application is executing thereby providing better client application performance in terms of reduced latencies, higher bandwidth and less overhead (e.g., reduction in data transfer costs). Policy based management may dynamically and automatically migrate workloads between the host and data storage system.

Such migration may be temporary and based on a variety of different and possibly dynamically changing criteria over time as related to, for example, the application's execution profile, data storage system resource availability, data storage system workload, network or interconnect bandwidth capability and its current usage (e.g., as related to the connections between the host and data storage system), and the like. At various points in time, such client applications may be migrated between the host and data storage system. For example, the client application may be migrated from the host to the data storage system for a first time period (e.g., such as a few hours, portion of a day, at scheduled times during the day, week, or month, in response to currently observed or expected client application execution behavior and/or current availability of data storage system resources, and the like). At a second later point in time, the client application may be migrated from the data storage system to the host for execution thereon. Such migration back to the host may occur as a result of, for example, expiration of a time period based on a schedule, changes in currently observed or expected client application execution behavior, increases in data storage system workload for processing received I/O requests thereby decreasing availability of resources for client application execution, and the like.

Figure 3:
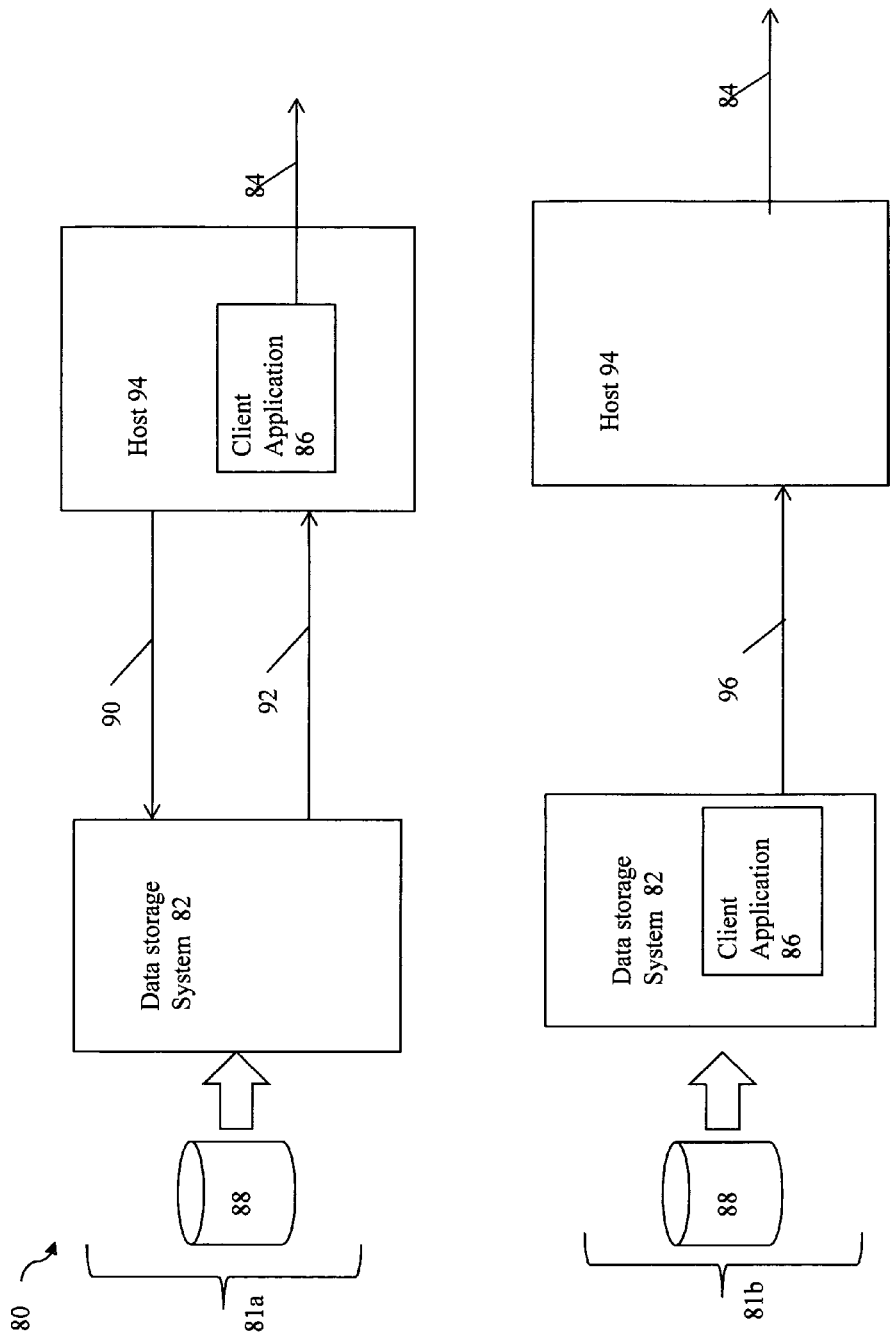
FIG. 3 is an example illustrating data transfer in connection with a client application and the data storage system.

Referring to FIG. 3, shown is an example 80 illustrating data transfer in connection with a client application 86. The top portion 81a illustrates a typical flow of data as may be used by the client application 86 when executing on the host 94. The client application 86 may perform an operation requiring data to be accessed or acquired from the device 88 of data storage system 82. To this end, a request is issued from the host 94 to the data storage system 82 for the data as illustrated by 90. The data storage system 82 processes the request by obtaining the requested data from the device 88, storing the requested data in memory internal to the system 82 such as in cache, and then returning the requested data to the host 94 as illustrated by 92. The client application 86 may then perform processing using the acquired data and output any result of the processing to the user as illustrated by 84. In connection with the foregoing of 81a, there is a cost or overhead associated with the data transfer represented by 90 and 92. For example, if the client application reads a large amount of data to perform the operation, the costs associated with the data transfer represented by 92 may be quite high relative to the total costs to perform the operation (e.g., in terms of elapsed time, resources utilized and the like). In this case, migrating the client application 86 from the host 94 to the data storage system 82 for execution as illustrated in 81b may greatly reduce such data transfer costs associated with the data transfer illustrated by 92. In connection with 81b, the client application may execute using resources of the data storage system such as a processor, cache, and memory of the data storage system allocated for its use. The client application 86 may access its data on the device 88 without incurring the additional data transfer costs associated with 90 and 92 since the client application 86 and its data reside on the same data storage system. It should be noted that in connection with 81b, a cost is associated with 96 as may be needed to return any output from the operation to the host 94 as may be returned to an end user or other requester of the operation.

As described above, the client application 86 may be migrated to, and execute on, the data storage system 82 for a time period. For example, the application 86 may execute on the system 82 for a time period while the application 86 performs particular operations, while the workload of the data storage system is otherwise small or low (e.g., reduced number of received I/O requests such as during off-peak hours), and the like. After such time period, the application 86 may then be migrated back to the host 94 for execution. The foregoing may be repeated in an ongoing manner in an embodiment in accordance with techniques herein for one or more such client applications of one or more hosts where such applications have their data stored on the data storage system devices.

What will now be described are ways in which an embodiment may select one or more candidate client applications for migration to the data storage system for execution thereon. Generally, any suitable evaluation criteria may be utilized but examples of such criteria are set forth below as may be used in an embodiment in accordance with techniques herein. Since a goal is to reduce data transfer costs as described above, such criteria may include assessing the relative benefit to an application with respect to data transfer cost reduction if the application is migrated from the host to the data storage system. The data transfer time may be determined that is the amount of time it takes for the application to obtain requested data. With reference to 81a, it is the amount of time it takes the client application 86 to obtain the requested data for the operation after such request has been sent from the client application 86. The data transfer time may include the amount of elapsed time for sending the request to the system 82, for the system 82 to access the data on device 88, and for the acquired data to be returned to the host 94. The application processing time may be determined that is the amount of time it takes the application to process the requested data to generate an output, result, or otherwise complete processing of the acquired data. A ratio may be obtained of data transfer time relative to the application processing time with respect to acquired data for a single operation. If the foregoing ratio of data transfer time/application processing time is very small (e.g., less than a defined threshold), then the data transfer time may be characterized relatively small in comparison to the application processing time, (e.g., data transfer time=X seconds and application processing time 100X or 1000X). In contrast, if the ratio of the data transfer time/application processing time is very large (e.g., more than a defined threshold), then the data transfer time may be characterized as relatively large in comparison to the application processing time (e.g., data transfer time 1000X and application processing time=X). Since goal may be, for example, to eliminate or reduce as much overhead costs as possible such as may be related to the data transfer time and also reduce latency, a candidate application for possible migration from the host to the data storage system is an application or applications having the largest such ratios thereby identifying the client applications expected to obtain the greatest benefit or reduction in data transfer time. As a variation, a threshold ratio may be defined and an application may be a candidate for migration if its ratio is above the threshold ratio. An embodiment may then select one or more such applications having the largest ratios where each such ratio is also at and/or above the threshold. It should be noted that the foregoing times and ratios described above and also elsewhere herein may represent average values determined over a time period.

As another example of criteria, a second ratio may be obtained related to the amount or size of data input (e.g., read or acquired for processing) relative to the amount or size of the data output (e.g., generated as a result of completing the processing of the acquired input data). The second ratio may be determined as a first quantity representing the size or amount of acquired data to perform the operation with respect to a second quantity representing the size or amount of data output as a result of completing operation processing of the acquired data. For example, a client application may read 1 MB of data that is processed to generate a resulting data output that is 10 KB in size. Applications having a relatively large value for the second ratio (e.g., larger than a threshold and/or those one or more applications having the highest second ratio values) may be candidates for migration. In a manner similar to that as described above, a candidate application for possible migration from the host to the data storage system is an application or applications having the largest such second ratios. As a variation, a threshold ratio may be defined and an application may be a candidate for migration if its second ratio value is above the threshold ratio. An embodiment may then select one or more such applications having the largest second ratio values where each such second ratio value is also at and/or above the threshold. It should be noted that the foregoing size or amount and ratios may represent average values determined over a time period.

The foregoing are two examples of determining which client applications are candidates for migration to the data storage system based on reducing costs or overhead as may be measured, for example, in terms of time (e.g., thereby decreasing overall response time), and resources expended as dependent on the amount of data transferred over the host-data storage system connection. Other suitable criteria may be used to evaluate which client applications most benefit from migration to the data storage system in terms of reducing client application latency or response time, reducing an amount of resources utilized for performing the client application processing (e.g., resources of the host, data storage system, and/or network), and the like.

An embodiment may observe application execution performance to identify which applications exhibit particular workload characteristics that may benefit most from such migration from the host to the data storage system. For example, an application which primarily performs sequential reads may be a candidate for migration. To further illustrate, an application that performs frequent search queries is an example of candidate for migration from the host to the data storage system. With such queries, the application may read a relatively large amount of input data in order to determine a single output result that is small in size (e.g. such as relative to the amount of input data). As another example, consider an application that may perform fraud detection where a large volume of credit card transaction information may be processed to determine a single small result.

It should be noted that the output or result of the operation may be transmitted back to host such as to output to a user or other requester using the application services. Therefore, a migration candidate may be expected to generate a relatively small amount of output as a result of processing acquired input data. If the amount of output data is the same or larger than the input data processed (to generate the output data), there is generally no benefit in terms of reducing overall data transfer costs by migrating the application to the data storage system since such output data is then typically transmitted to the host once computed by the application executing on the data storage system.

An embodiment may utilize various criteria to determine when to migrate a client application to/from the data storage system based on availability of data storage system resources or current resource utilization (e.g., such as CPU, memory and cache utilization). Trends or history information regarding observed data storage system performance may be examined to determine times of the day, week, month, and the like, when the data storage system workload is busy or high (e.g., thereby indicating minimal unused resources) and when the workload is minimal or lowest (e.g., thereby indicating times when the system typically has resources available for other uses such as for allocation and use by migrated client applications). Thus, an embodiment may utilize criteria providing information regarding current data storage system resource utilization such as CPU and/or memory utilization of the system overall, utilization of particular components or hardware (e.g., such as utilization of particular FAs and DAs, or resources thereof as will be described in more detail below). One or more such data storage system resource utilization metrics may be used to dynamically determine when to migrate one or more applications to or from the data storage system, how many applications to migrate to or from the data storage system based on an amount of available resources, and the like. An embodiment may perform the migration of the client application(s) to/from the data storage system responsive to a real-time evaluation of current conditions on the data storage system. An embodiment may also examine observed data over a time period and determine a migration schedule based on historical periods or trends of data storage system resource utilization and/or workload.

In an embodiment, the identification and migration of suitable client applications may be performed periodically so as to dynamically adapt to changing workload characteristics of the applications, data storage system and host at different points in time. The evaluation and migration of the client applications between the host and data storage system (e.g., from the host to the data storage system and/or from the data storage system to the host) may be performed manually and/or automatically such as using code executing on the host and/or data storage system.

Once one or more client applications executing on a host have been selected for migration to the data storage system, the applications may be migrated and then executed on the data storage system. In one embodiment as described below, the client application may execute in a virtualized environment on the host and the data storage system. It should be noted that although an embodiment is described below in which both the host and data storage system utilize a virtualized environment to run the client applications, other suitable variations are possible in an embodiment using techniques herein. For example, the host may not provide a virtualized environment for executing the client application and the data storage system may execute any migrated client applications in a virtualized environment.

The techniques herein may utilize a virtualized environment using virtual machines (VMs) to facilitate better utilization of data storage system resources, such as resources including CPU, cache and memory. In this case, the customer may utilize VMs which execute on the data storage system and use resources thereof to perform tasks of clients which are otherwise externally connected to the data storage system. As may be determined at various points during operation of the data storage systems, the VMs utilized for executing client applications or tasks may be migrated from the data storage system back to execution on the host or client system as the data storage system resources may be needed, for example, for use with increasing demands for the data storage system processing tasks. In this manner, the portion of the data storage system resources which may be unused or underutilized at a first point in time may be used for processing migrated or hosted client applications. As the demand for the data storage system resources increases for use with data storage system processing, non-data storage system processing tasks as performed by the client applications may be migrated such as by migrating the one or more VMs of the data storage system executing the client applications to the original client or host system. In a similar manner, as additional resources of the data storage system again become available, the VM executing the client application may again be migrated from the host to the data storage system. The foregoing process may be performed repeatedly at various times on an ongoing basis during the lifetime of the data storage system, host and client application.

As an example, VMs may execute using one or more processors of a single data storage system using virtualization software produced by VMware, Inc. In the context of each virtual machine, one or more applications may be executed that generally provide any service that may be utilized by a service requester. For example, the applications may include any one or more of an email application such as Microsoft Exchange, a web server, a proxy server, a DHCP server, a database application, and the like. Each VM may utilize its own set of data that is located on a same device or a different device than data used by other VMs. In the context of a virtualized environment of the data storage system in which the data storage system executes a VM hosting such an application to perform a non-data storage system task, the application may also be referred to as a VM-hosted application executing on the data storage system. More generally, the application executing in the virtualized environment in the context of a VM may be referred to as a VM-hosted application. As will be described in more detail below, the VM-hosted application may also be executed in a virtualized environment on an external host or server (e.g., external with respect to the data storage system).

Figure 4:
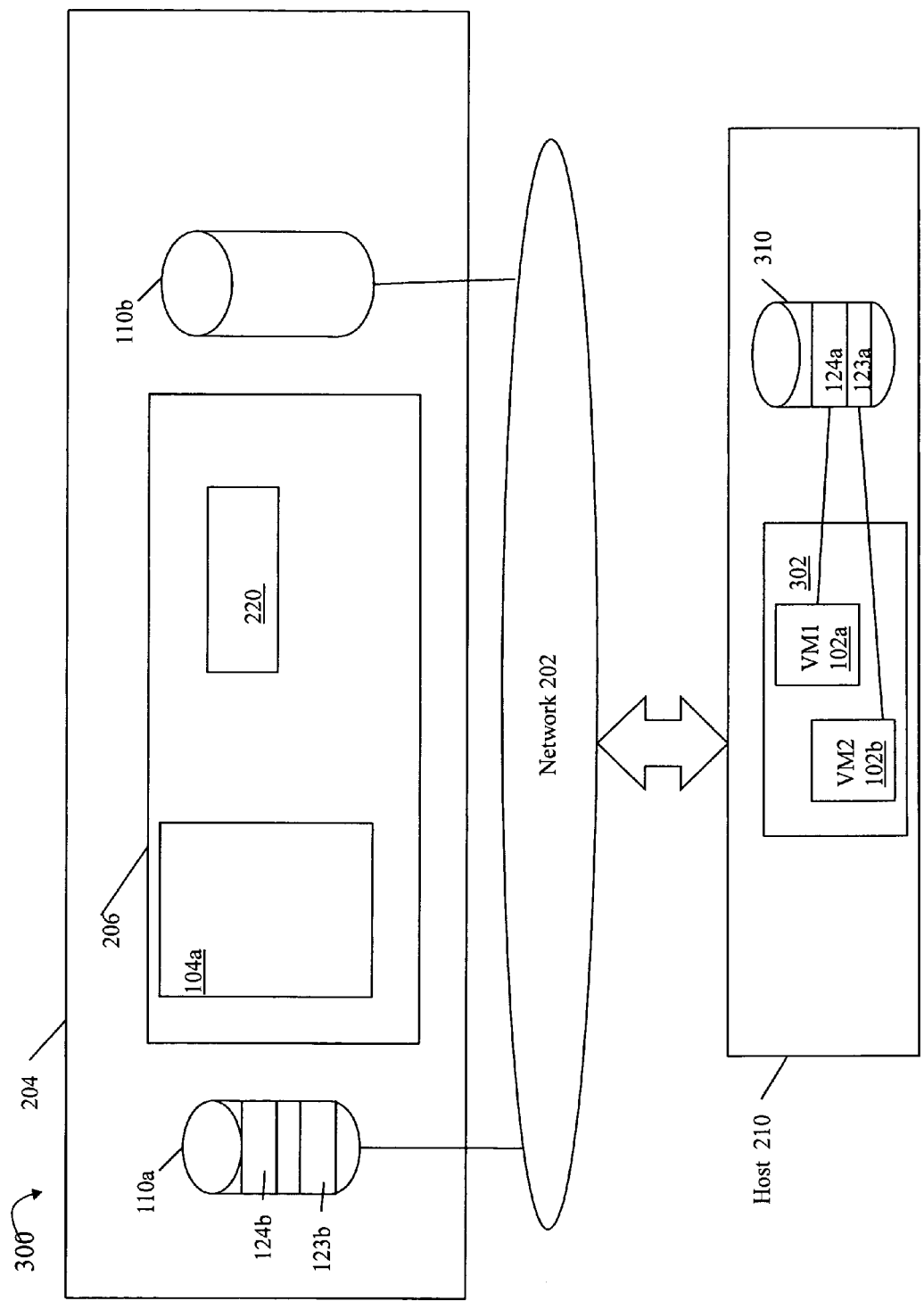
FIGS. 4-5 are examples illustrating a virtualized environment in connection with client application migration in an embodiment in accordance with techniques herein.

Referring to FIG. 4, shown is an example of VMs as may execute on a host in an embodiment in accordance with techniques herein. The example 300 includes host 210, network 202 and data storage system 204. The data storage system 204 includes storage devices 110a, 110b and element 206 representing software or code executing on the data storage system 204. The host 210 includes VM1 102a and VM2 102b managed by VM manager 302 on the host. Element 104a may represent a VM manager on the data storage system 204 that currently has no executing VMs and applications therein. Element 220 may represent management and other software on the data storage system 204. The host 210 and data storage system 204 may communicate over network 202 with devices 110a and 110b visible or exposed to the host 210 thereby allowing the host to access data stored on 110a, 110b. The host 210 includes storage device 310. Each of 104a and 302 may be a hypervisor that performs VM management in connection with multiple VMs such as VMware ESX Server by VMware, Inc. Such a hypervisor, or more generally, VM manager, may be installed and run directly on server hardware without requiring an underlying operating system. Each of the VM managers 104a, 302 may perform management of the underlying server's physical resources for use among the multiple VMs that can run simultaneously. In this example, a database application may be executed by VM1 102a and an email application may be executed by VM2 102b. In one embodiment, the foregoing code included in 206 of the data storage system may execute on a same processor of the data storage system. As a variation, code of 220 may execute on a first processor of the system 204 and code of VM manager 104a (including any managed VMs and applications executing in the context of such VMs) may execute on a second different processor of the system 204.

Each VM may access data used in connection with the VM (e.g., VM metadata) and also for the application executed in the context of the VM. In connection with the example of FIG.

4, VM1 102a may access its VM metadata 124a (stored locally on the host on device 310) and the email application's email-related data 124b (stored on device 110a of the data storage system). VM2 102b may access its VM metadata 123a (stored locally on the host on device 310) and the database application's database-related data 123b (stored on device 110a of the data storage system). The VM (virtual machine) data used by a VM may include data used by the particular application executing on the VM (e.g., such as represented by elements 123b, 124b, where 123b represents database data and log files for a database application executing as VM1 102a, and where 124b represents e-mail application data) as well as VM metadata (e.g. such as represented by elements 123a, 124a) regarding the VM's own state, configuration, and execution context such as, for example, data stored in memory, CPU registers, swap files, log files, and the like.

In accordance with techniques herein as will be described in more detail below, a VM and the application executing therein, may be migrated from the data storage system to another computer system (e.g., such as a host or server), and vice versa (e.g., from the host to the data storage system). In connection with performing the migration of the VM, such migration may include migrating execution of the VM such that the VM, along with the VM-hosted client application, are executed on another system. The migration of the VM may also include migrating (e.g., either from the host to the data storage system, or vice versa) the VM data used by the VM as related to its own execution state, context and the like (e.g., elements 123a, 124a). However, the application data (e.g., 123b, 124b) used the particular VM-hosted application may always remain on the data storage system 204. To further illustrate in connection with migrating a VM from the host to the data storage system, the VM (and VM-hosted application) and the VM data used by the VM as related to its own context (e.g. VM metadata 123a, 124a) may be migrated to the data storage system. In connection with the foregoing, the VM (e.g. including the image of the virtual machine) and its VM metadata may be migrated from the host (e.g., the VM may be migrated to execute on the data storage system and additionally, the VM data used by the VM 123a, 124a is also relocated to the data storage system).

It should be noted that the foregoing VM data migration or movement in connection with techniques herein may be performed using facilities available for the particular VM framework and architecture used in an embodiment. For example, an embodiment using VMs and a VM framework and architecture by VMware, Inc., may use Storage vMotion to migrate VM data. VM data transfers may be triggered under the instructions issued by a VM manager. In one embodiment utilizing SCSI commands, the Storage vMotion may issue commands, such as XCOPY (or extent copy) command, to copy the relevant data from a source device to a target device.

For this example, the VMs 102a, 102b and applications executing in the context thereof, and the VM metadata 123a, 124a may be migrated to the data storage system 204 from the host 210 as will now be described in connection with FIG. 5.

Figure 5:
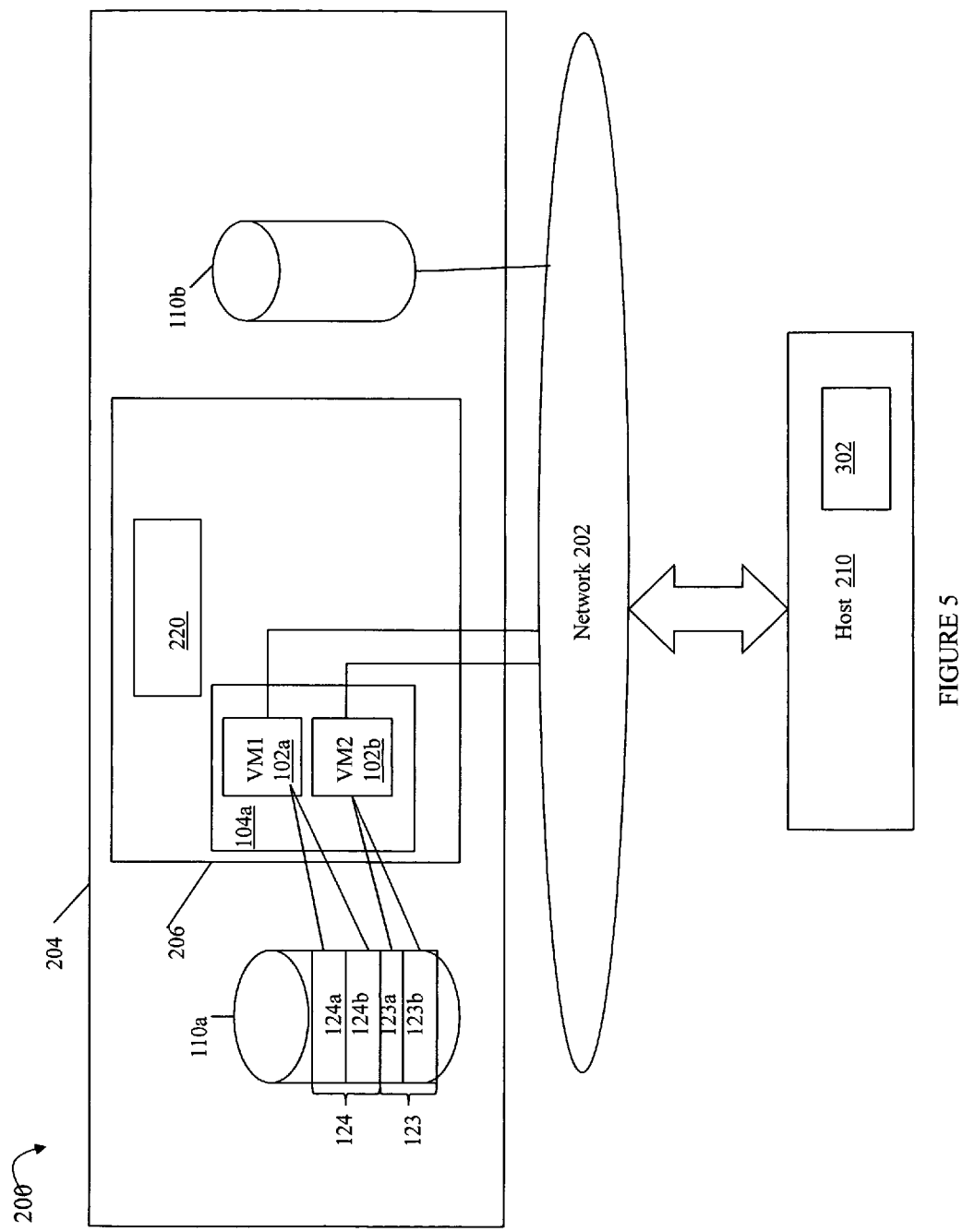

Referring to FIG. 5, shown is an example illustrating how a system may be configured in an embodiment in accordance with techniques herein after the foregoing VM migration from the host to the data storage system is completed. The example 200 includes a data storage system 204 configured in accordance with the VMs as described and illustrated in FIG. 4. In the example 200, the VMs 102a, 102b may execute on a processor 206 of the data storage system 204. The system 204 may include storage devices 110a, 110b. As described above, VM1 102a may access its VM data stored at 124 of device 110a, VM2 102b may access its VM data stored at 123 of device 110a. In the example 200, element 124 may collectively represent VM metadata 124a and application-related data 124b used by VM1 102a and the application executing therein. Similarly, element 123 may collectively represent VM metadata 123a and application-related data 123b used by VM2 102b and the application executing therein. The data storage system 204 may be configured to expose VMs 102a, 102b to the host 210 over the network 202 so that the host, as a client, may utilize the services provided by the VMs 102a, 102b. The host 210 may connect and use the services provided by each VM using any one of a variety of different suitable software communication options such as, for example, using SSH (secure shell), Telnet, FTP (file transfer protocol), a RDP (remote desktop services such as may be provided in a Windows-based environment), HTTP, and the like.

The example 200 may illustrate a configuration of the data storage system 204 where all applications providing services are executed through VM-hosting on the data storage system. At a later point in time, such as through monitoring data storage system performance, the workload of the data storage system may increase or decrease. Such workload may be determined, for example, through monitoring metrics related to I/O operations (e.g. throughput, amount of data read/written per second, and the like), monitoring resource utilization (e.g., such as for CPU, memory, DA or other component level utilization), and the like. Management software 220 of the data storage system may monitor and evaluate data storage system resources and workload metrics over time such as at defined periodic intervals. For example, the management software 220 may monitor and evaluate one or more metrics such as may be related to any of resource consumption, resource utilization, and/or data storage system performance or workload. The one or more observed metrics may be measured or evaluated in accordance with one or more thresholds or criteria such as, for example, CPU utilization over a time period, memory utilization over a time period, I/O throughput (e.g., number of I/O operations processed during a time period), I/O service time, I/O response time, amount of data read and/or written during a time period, and the like. The criterion/criteria may specify one or more thresholds for the one or more metrics. The foregoing may be used in determining whether to migrate VM-hosted applications to and/or from the data storage system. When the software determines that one or more of such thresholds have been reached, the software may perform processing to accordingly notify the user and/or automatically migrate one or more of the VMs and VM-hosted applications (e.g., non-data storage system processing tasks) between the host and data storage system (e.g., to the data storage system from the host, or vice versa, depending on the evaluation).

Subsequently, when the data storage system 204 determines through monitoring as described herein that the system 204 does not comply with specified criteria thereby indicating it is time to migrate one or more VM-hosted applications either to or from the data storage system, the user may be prompted with a notice or suggestion to this effect and then provided with options in connection with this migration. For example, the user may be presented with a list, such as through a user interface (UI) display, and may then select which one or more VMs and VM-hosted applications to migrate to or from the data storage system. As a variation to the foregoing, the management software 220 may automatically perform such migration based on a predetermined policy or parameters and may perform such migration upon a determination that one or more thresholds are exceeded without further user confirmation and/or input. Thus, an embodiment may provide for varying degrees of automation for use with the techniques herein to migrate the VM-hosted applications between the host and data storage system when one or more thresholds of the criteria are met or exceeded.

The migration may be automated using management software 220. Performing the migration such as when migrating from the host to the data storage system, may include, for example, pausing the VM of the data storage system 204, copying the VM and also copying the VM metadata to the external host, and then resuming execution of the VM and its VM-hosted application on the external host. As will be appreciated by those skilled in the art, the particular steps required to perform the migration may vary with the virtualized environment and available services for the virtualized environment.

It should be noted that a VM-hosted application may be migrated between a host and data storage system as needed and that such migration may include migrating an application from the data storage system to the host and also from the host to the data storage system as may be appropriate. For example, an application may be migrated from the host to the data storage system during off-peak usage times of the data storage system, as temporary measures such as when a software upgrade is being performed to the host, and the like. As another usage, a VM-hosted application may execute on a data storage system during times of the day when the data storage system is not busy (e.g., as may be measured in connection with one or more I/O performance metrics). When the data storage system load (e.g., as measured by one or more performance metrics) is below a particular threshold indicating "not busy", such as during evening hours, on weekends, and the like, the application may execute as a VM-hosted application on the data storage system. When the data storage system is above the threshold indicating that the data storage system is busy, the VM-hosted application may otherwise not be allowed to execute on the data storage system and may rather execute on an external host as described above. For example, an application may perform a function such as to run daily reports. This application may also be executed as a VM-hosted application on the data storage system during the evening or other off-peak hours. Otherwise, the application may execute on the host as a VM-hosted application. In connection with the foregoing, software may be used to automatically perform the foregoing to varying performance loads of the external host, storage system, and/or other systems.

In connection with execution of the migrated client applications executing on the data storage system, an embodiment may use any one or more different techniques in determining an allocation or amount of data storage system resources for use by such client applications. For example, an embodiment may have a static or fixed amount of dedicated computing resources on data storage system allocated for use by the executing migrated client application(s). To further illustrate, an embodiment may have a dedicated CPU or main computer processor or may have a dedicated processor on a component of the data storage system such as of an FA, allocated for executing migrated tasks. Similarly, there may be a fixed dedicated amount of memory, cache or other data storage system resources allocated exclusively for migrated client application usage. As a variation as also described in more detail herein, the amount and/or type of data storage system resources allocated for use between the migrated client applications and other data storage system processing tasks may be dynamically adapted or adjusted rather than have a fixed limit or amount.

In connection with the VMs executing on the data storage system in the embodiment described above, the system may allocate or partition a portion of FA resources for use in executing migrated client applications as will now be described in more detail.

Figure 6:
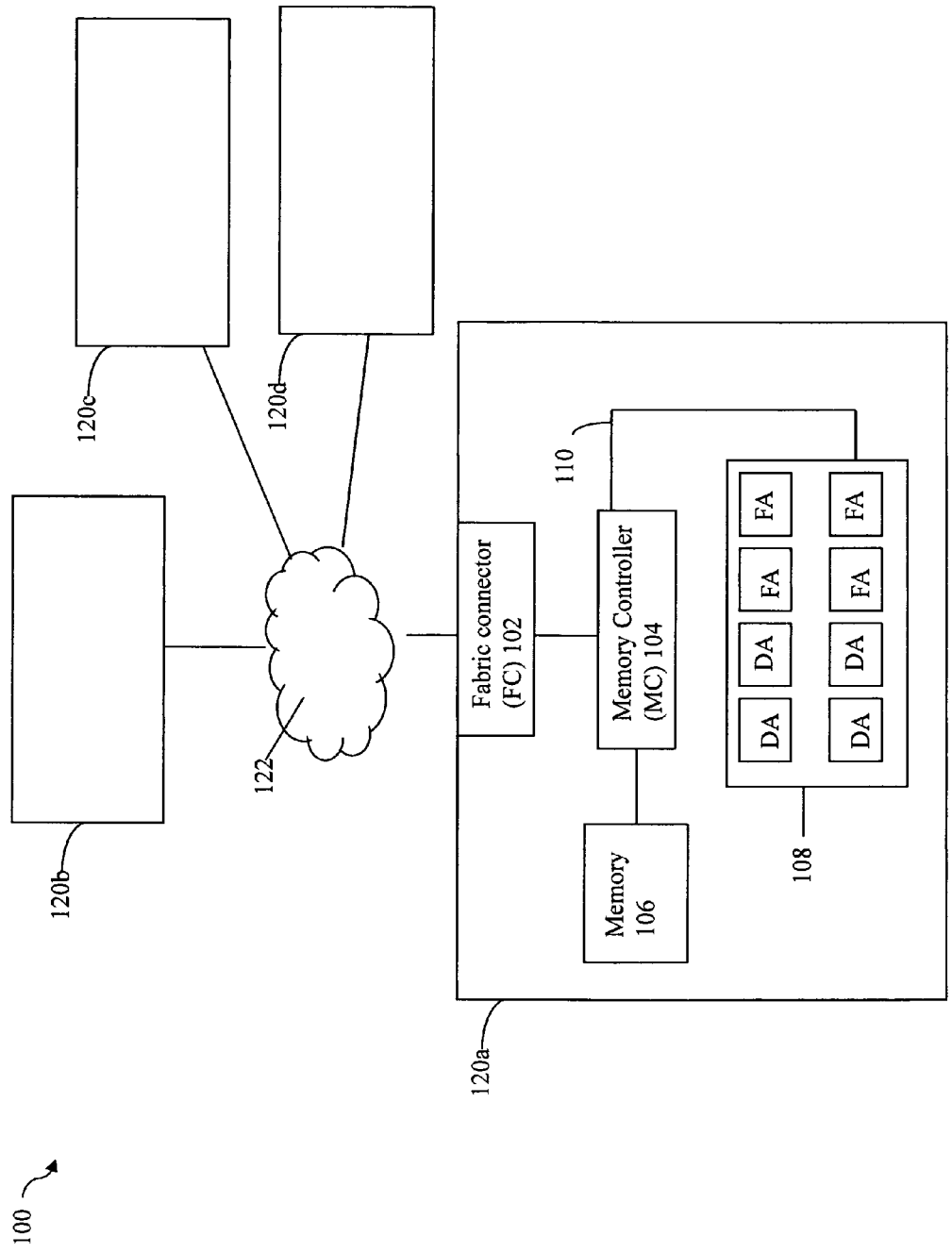
FIGS. 6-7 are examples illustrating components as may be included on a board in an embodiment in accordance with techniques herein.

Referring to FIG. 6, shown is an example of components that may be included in a data storage system. The example 100 includes a plurality of boards denoted as 120a-120d which communicate over a fabric such as to access global memory. The fabric may include a switch 122 and connections between the switch 122 and boards 120a-120d. Although 4 boards are illustrated herein for exemplary purposes only, an embodiment may include any number of boards in accordance with limitations of a particular embodiment. For example, an embodiment of a data storage system may include any number of boards from 2-16, inclusively. Each board may be a physical board including hardware components thereon as illustrated in more detail in connection with 120a. Each board may include a fabric connector (FC) 102, a memory controller (MC) 104, memory 106, a plurality of directors 108, and bus 110 used for communications between the MC 104 and the directors of 108. Each board 120a-120d may include one or more different types of directors of varying number. The example 100 illustrates board 120a as including 4 DAs and 4FAs in a particular arrangement. However, it will be appreciated by those skilled in the art that a board may include a different number and/or arrangement than as illustrated. The FC 102 is configured to facilitate communications between the board 120a and other boards 120b-120d connected to the fabric, and each other, through switch 122. The MC 104 communicates with the FC 102 and directors 108 for accessing the memory 106. In one embodiment, each of the FC and MC may be implemented as an application specific integrated circuit (ASIC) configured to perform the functionality described herein.

Although detail of components that may be stored on a single board is only illustrated with respect to board 120a, each of the other boards 120b-120d connected to the switch 122 may also be similarly configured. Memory 106 of each of the boards connected to the fabric may be partitioned into a plurality of different logical partitions as will now be described in more detail.

Figure 7:
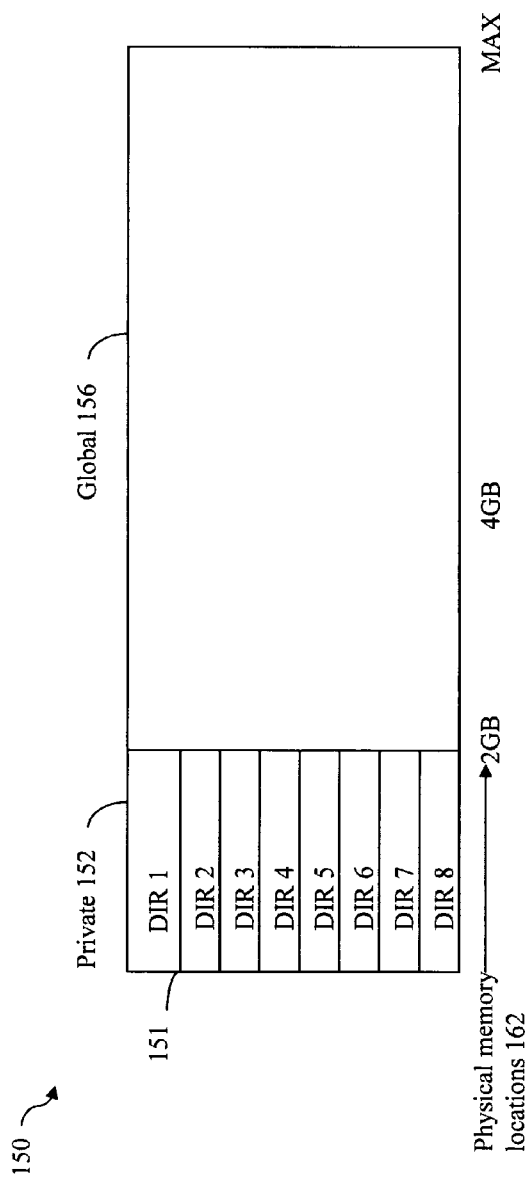

Referring to FIG. 7, shown is an example of how physical memory (e.g., element 106) of a single board of FIG. 6 connected to the global memory fabric of the data storage system may be logically partitioned. It should be noted that the example 150 illustrates a logical partitioning of a physical memory portion as may be included on a single board although each such board 120a-120d of FIG. 6 may be configured as illustrated in FIG. 7. The example 150 illustrates classes of logical partitions of physical memory including a private partition 152 and global partition 156. The private partition 152 includes a segment for each director on the single board. Each such segment of memory included in 152 (denoted DIRa, "a" uniquely identifying the associated one of the directors on the board) is associated with a different one of the directors for exclusive use only by the single associated director. No other director on the same single board or another board is allowed to access the segment of the private partition designated for the associated director. Global partition 156 includes memory which is accessible or usable across the internal fabric by all connected directors. In other words, with reference to FIG. 6, any director on any of the boards 120a-120b may access the memory of the global partition 156. As an example, a first global partition of board 120a is accessible by any director on board 120a and also any director of any of the other boards 120b-120d connected to the fabric, such as through switch 122. As such, all global partitions of physical memories across all boards may comprise a logical arrangement of a distributed global memory.

In the embodiment described above, a director such as an FA or DA may be implemented as a single physical component including resources used by each director such as one or more processors. Additionally, rather than include the private memory allocated for exclusive use by an FA or DA on the single physical component, such private memory may physically reside as an aggregated portion of memory on the board upon which the director is included as described above. In such an embodiment, resources of each director on the board may represent a logical partitioning and may include those resources (e.g., such as processors) located on the single hardware component for the director as well as a portion of the private memory which is allocated for exclusive use by the director but is not physically located on the single director hardware component. As an alternative to the foregoing, an embodiment may physically locate the director's private memory portion on the same single hardware component as the director's processors and other resources. More generally, an embodiment may physically locate the logically partitioned director resources in the same or different physical components using any suitable arrangement some of which are described above.

In an embodiment as described above, the migrated client application(s) may be executed in a virtualized environment on the data storage system using a portion of FA resources. For example, the client application may execute in a virtualized environment as described herein on a processor of an FA using a portion of the FA's private memory such as illustrated in FIG. 7. In a similar manner, one or more migrated client application(s) may be executed in a virtualized environment using a portion of DA resources. For example, the client application may execute in a virtualized environment as described herein on a processor of a DA using a portion of the DA's private memory. In an embodiment, a single director such as an FA or DA may have local resources for its own exclusive private use including one or more processors such as may be integrated and included on a single physical component. In such an embodiment, any number of the FA's processors may be further allocated for exclusive use by the migrated client application(s) with the remaining FA processors used for other processing of data storage system tasks. For example, all or a portion of the FA's processors may be used to execute the migrated client applications in the virtualized environment as described above. In a similar manner, any amount of the FA's private memory or other FA private resources may be allocated for use by the migrated client applications. As another example regarding FA private resources, an FA may include external communication modules or units providing for one or more external communication ports. The one or more FA ports are also resources that may either be shared for use in connection with the migrated applications and other data storage system processing tasks, or may be allocated for exclusive use by the migrated applications. For example, if a single FA has multiple ports, a portion of those ports may be allocated for dedicated or exclusive use by the migrated client applications executing on the data storage system.

The foregoing are some examples of partitioning director-level resources of the data storage system for use between the migrated client applications and other data storage system processing tasks. A portion of less than all of the FA or DA private resources may be allocated for exclusive use by the migrated client applications. Such resources may include a portion of the FA's processors, a portion of the FA's private memory and a portion of the FA's external communications bandwidth (e.g., based on allocation of FA port(s) for migrated client application usage). As a variation, an embodiment may partition all resources of a selected one or more directors (e.g., DAs and/or FAs) for use by the migrated client applications when executing on the data storage system. For example, an embodiment may specify that all resources of one or more FAs are allocated for exclusive use by the migrated client applications executing on the data storage system.

The amount of data storage system resources allocated for exclusive use by the migrated client applications at a point in time may be statically allocated (e.g. fixed) or may otherwise be dynamically adjusted over time such as with use of automated techniques as described herein based on the workload of the data storage system.

Figure 8:
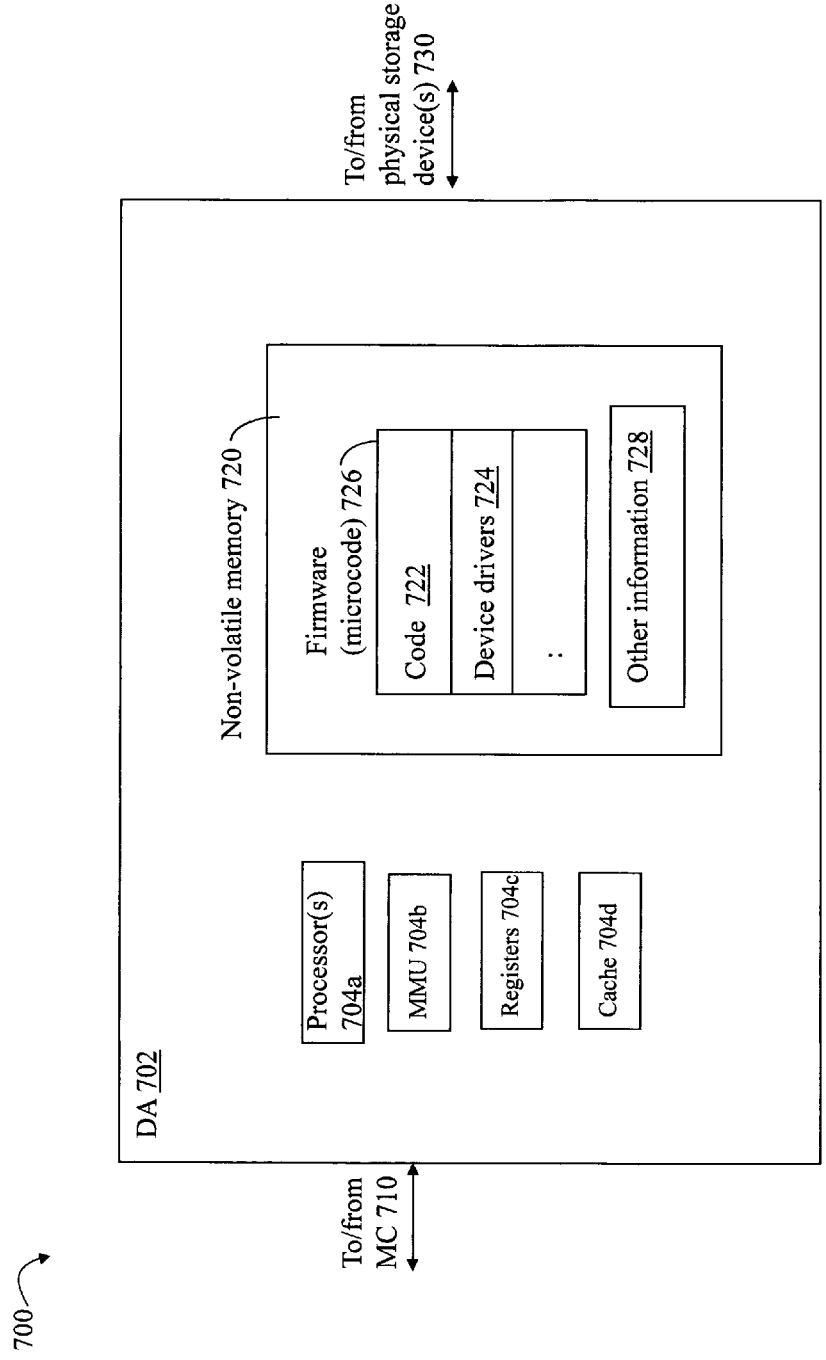
FIGS. 8-9 are examples of components of different directors in an embodiment in accordance with techniques herein.

Referring to FIG. 8, shown is an example illustrating a DA in more detail as may be included in an embodiment using the techniques herein. The example 700 illustrates a DA 702 including a processor 704a, MMU 704b, registers 704c, cache 704d, and a non-volatile memory (NVM) 720. An embodiment of a DA 702 may include other components than as illustrated. In one arrangement, functionality of 704a-704d (and possibly other components not illustrated) may be embodied in an integrated component. Components which are not integrated may communicate over an internal bus (not illustrated). The DA 702 may communicate with the memory controller (MC) as illustrated by 710 and write/read data to/from the physical storage devices as represented by 730. The NVM 720 may include microcode or firmware 726. The firmware 726 may include code 722, device drivers 724, and other code used by the DA. The code 722 may include code for performing operations and functionality such as, for example, destaging data to devices serviced by the DA, reading data from devices serviced by the DA, and the like. The NVM 720 may also include other information 728, such as code and/or data used by the DA. The MMU (memory management unit) 704b included in each director may provide for protecting and restricting access by directors and FCs (fabric connectors) to appropriate portions of physical memory located on the boards. For example, the MMU may be used in an embodiment to restrict physical memory access of the director, for example, to the directors private memory portion and those portions of physical memory corresponding to the distributed global memory across all boards. It will be appreciated that other directors may include components similar to those as described and illustrated for a DA with appropriate modifications and differences varying with director type.

Figure 9:
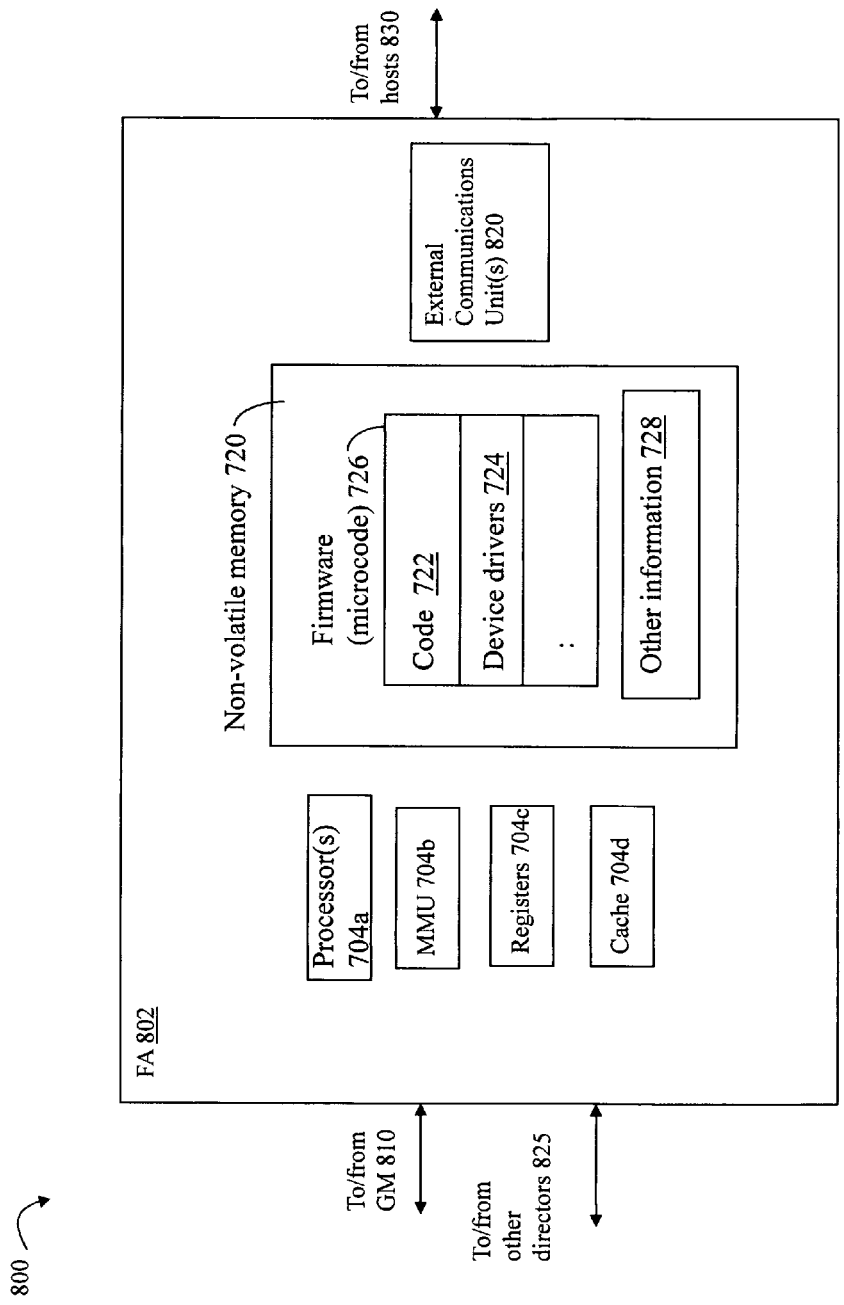

Referring to FIG. 9, shown is an example illustrating an FA in more detail as may be included in an embodiment using the techniques herein. The example 800 includes components similar to those as described above in connection with FIG. 8 as denoted by the same reference numbers. The FA 802 may communicate with the global memory (GM) as illustrated by 810, communicate with the host as illustrated by 830, and communicate with other directors as illustrated by 825. It should be noted an embodiment may include the CM 38 of FIG. 2B and use the CM 38 in connection with communicating with other directors. The NVM 720 may include microcode or firmware 826. The firmware 826 may include code and/or data for performing the processing described herein by the FA. Additionally, the FA may also include one or more external communication units 820 used for communicating with the host or other components external and connected to the data storage system. For example, the units 820 may include the hardware for one or more ports of the FA through which the host is able to communicate with the data storage system such as, for example, by issuing I/O and other requests. As noted above, the private memory of the DA and FAs may not be included on a single integrated component or hardware unit of FIGS. 8 and 9. Rather, as described above, such private memory logically partitioned for private dedicated use by each DA and FA may be physically located in a memory module separate from another hardware component comprising other DA and FA-specific exclusive resources. As a variation, the private memory for a director may be included on a single integrated hardware component with all other director specific or exclusive resources.

Figure 10:
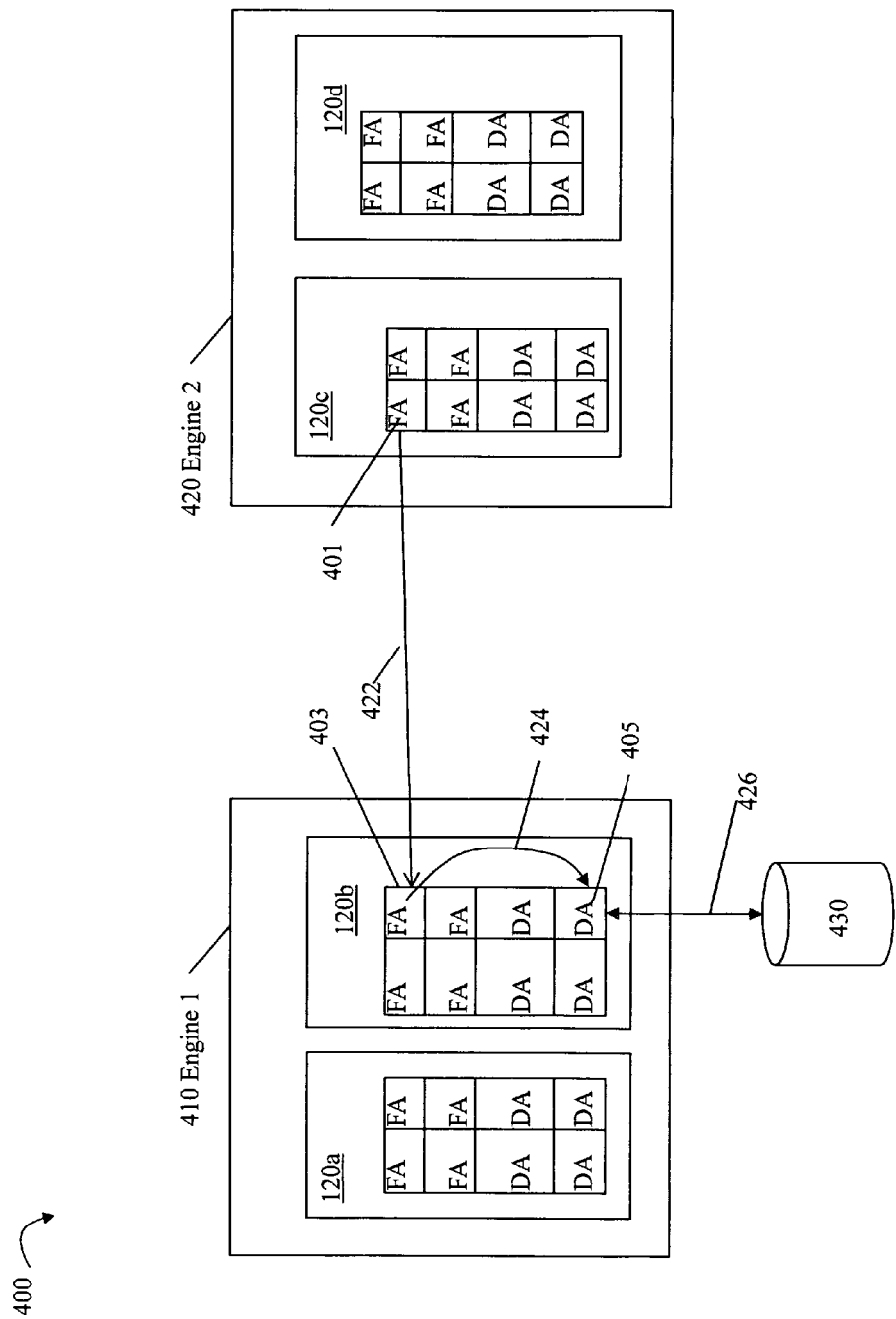
FIG. 10 is an example illustrating groups of components that may be included in an embodiment of a data storage system in accordance with techniques herein.

Referring to FIG. 10, shown is another example of components that may be included in a data storage system and partitioned for exclusive use by the migrated client applications executing on the data storage system. In the example 400, pairs of boards containing multiple directors and other data storage system resources may be grouped together. For example, boards 120a, 120b may form pair 410 and boards 120c, 120d may form pair 420. Each of the boards 120a-120d may include multiple FAs, DAs, memory, and other components as described above such as in connection with FIG. 6. Elements 410, 420 may also correspond to other groupings of data storage system resources. For example, in one embodiment, each of 410, 420 may correspond to an EMC Symmetrix® VMAX™ engine. In such an embodiment, an engine or other logically represented grouping of components of the data storage system may be allocated for exclusive use by the migrated client applications when executing on the data storage system such as in the virtualized environment described elsewhere herein. For example, components of 420 may be allocated for exclusive use by the migrated client applications. Each of the groups 410, 420 and others as may be included in a data storage system may be able to communicate with one another over a communications fabric (not illustrated) such as described elsewhere herein in connection with communications between single boards 120a-120d. To further illustrate, a migrated client application may be executing on a processor of an FA of 120c in a virtualized environment as described above. The application may perform processing resulting in a request to access data on device 430. In this case, a request may be issued from FA 401 of 120c to FA 403 of 120b over the communications fabric (as illustrated by 422). The FA 403 may then communicate (424) with DA 405 to obtain (426) the requested data from device 430. The requested data may be returned to the FA 401 via a return flow path 426-424-422. In connection with the foregoing, it should be noted that the FA 403 receives and processes an I/O request from FA 401 in a manner similar to that as from an external host. In connection with the data storage system resource partitioning between migrated client applications and other data storage system tasks, the resources of 420 may be exclusively allocated for use in hosting the client applications in a virtualized environment although the client applications may also use other data storage system resources in connection with servicing I/Os of the client applications as illustrated above. In other words, although a portion of the data storage system resources may be allocated for exclusive use by the migrated client applications, such migrated client applications may also use additional resources of the data storage system in connection with servicing I/O requests to retrieve data. Thus, in some embodiments, the exclusively allocated resources for migrated client application use may be the only data storage system resources used by such client applications, or may alternatively be a portion of such resources that may be used by the client applications. Additionally, when allocating resources for exclusive use by the migrated client application(s), there may be a portion of resources of 420 such as with a distributed global memory that may not be reserved for exclusive use by the migrated client applications. This may vary with embodiment.

An embodiment may select to partition an amount of data storage system resources for use with particular migrated client applications in accordance with the needs of the migrated application(s). For example, as a matter of scaling in whether to partition a portion of FA resources or an entire engine or other group of components 420 may depend on, for example, when the resource usage needs of the migrated application are accommodated by the portion of FA resources or whether additional resources of a larger scaling (such as at the engine or group level 420) are needed. If the migrated application needs a certain amount of memory, the amount available from a single FA's private portion may be insufficient. As such, particular client applications may be migrated to the data storage system and execute in a virtualized environment having allocated resources of a single FA (or portion thereof), or of a group of components, such as illustrated by 420, depending on the application's needs. Additionally, once the application has been migrated to the data storage system from the host, the application may be further migrated for execution in one or more virtualized environments within the data storage system. For example, at a first point in time, the client application may execute in a virtualized environment using a portion of resources of a single FA. At a later point in time, the client application may be further migrated to execute in a second virtualized environment of the data storage system having resources of an entire group of components such as represented by 420 allocated for usage.

As described herein, the amount of one or more data storage system resources allocated for use by the migrated client applications may be determined dynamically based on the application's needs during execution. Furthermore, such needs may be balanced with the demands in workload of other applications which may or may not be migrated client applications. For example, reference is made to FIG. 11 including a table of values 500 specifying resource thresholds in terms of percentages for particular applications 1-3. The table 500 may be included as part of a defined data storage system policy for resource management. As will be appreciated by those skilled in the art, the foregoing values of 500 may be specified using absolute values or amounts, or in other suitable ways besides percentages. The table 500 may include a row of thresholds for each of the particular applications for a selected resource, such as memory. Each such application 1-3 may be executing on the data storage system. Application 1 may be a migrated client application and applications 2 and 3 may be applications that normally execute on the data storage system in connection with processing data storage system requests from clients. In other words, applications 2-3 may not be migrated client applications. For each application, a minimum amount of the resource is identified in 502, a target amount of the resource is identified in 504 and a maximum amount of the resource is identified in 506. At any point in time, the minimum amount of column 502 is available for each application to use. The target amounts in 504 may total 100% and represent an ideal or preferred balance of resource allocation among the applications 1-3. The maximum amounts 506 represent the upper limit or bound of the resource that each application may be allocated at any point in time. As an application requests more of the resource during execution, the information of 500 as well as current allocations to each application may be used to determine whether to allocate an additional amount of the resource. An application may be allocated storage as requested up to its target value in 504. For example, consider application 1 and its information of row 510. Assume that application 1 is currently at its target percentage of 30 and now requests an additional amount of the resource. Application 1 is only allocated an amount of resource over its target if both application 2 and application 3 are not at their respective target percentages (e.g., both applications 2 and 3 are currently allocated amounts of the resources below their respective targets of 504). Additionally, no application is allocated more than its respective maximum value in 506. The thresholds of table 500 for minimum, target and maximum may be a priori information such as estimated based on modeled data or previously observed data.

It should be noted that multiple such tables as illustrated in FIG. 11 may be used in connection with different resources, such as CPU time or utilization, cache, disk bandwidth, internal network consumption, and the like, that may be monitored in a particular embodiment.

Figure 12:
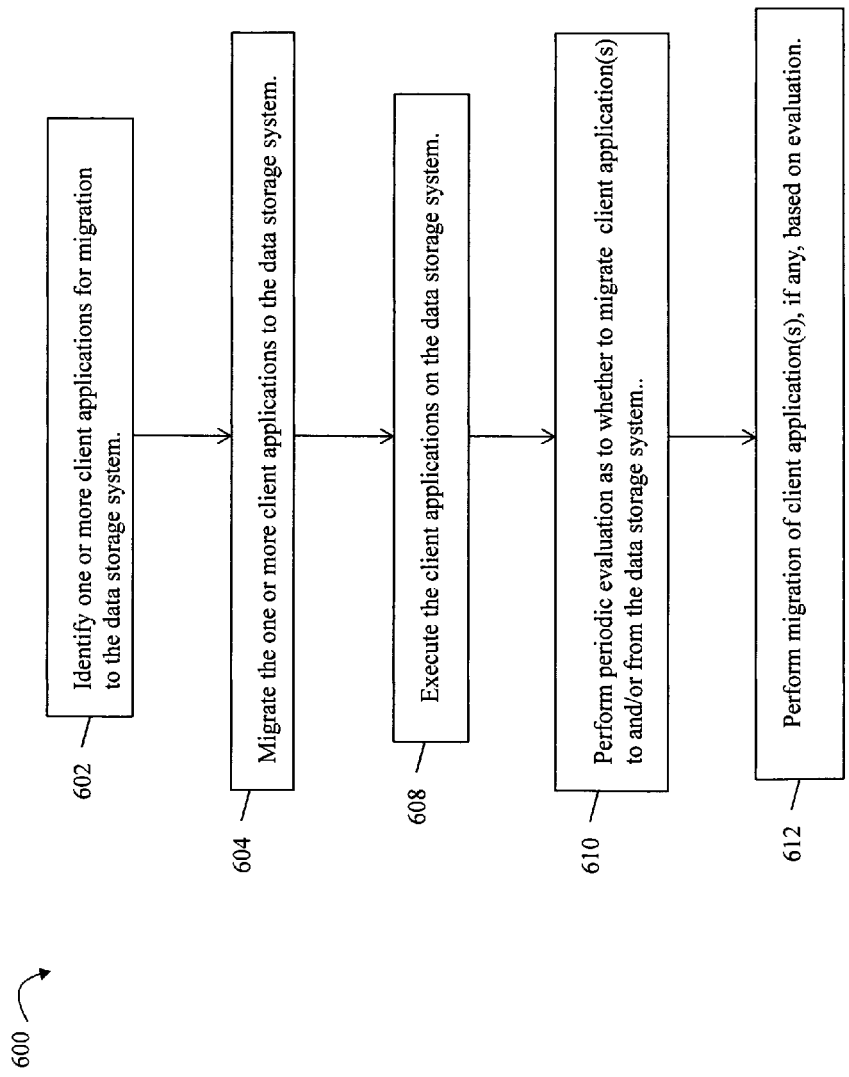
FIG. 12 is a flowchart of processing steps that may be performed in an embodiment in accordance with techniques herein.

Referring to FIG. 12, shown is an example of processing that may be performed in an embodiment in accordance with techniques herein. The flowchart 600 summarized processing as described above. At step 602, one or more client application on the host(s) having their data stored on the data storage system are identified as migration candidates. At step 604, the one or more client applications are migrated to the data storage system. At step 606, the migrated client applications commence execution on the data storage system. As described above, the client applications utilize the portion of data storage system resources allocated for their usage. At step 610, a periodic evaluation may be performed as to whether to migrate client application(s) to and/or from the data storage system. At step 612, any client application(s) are migrated consistent with the evaluation performed in step 610.

As will be appreciated by those skilled in the art, various exemplary embodiments are described herein and variations thereof are possible in connection with utilization of the techniques herein. For example, the foregoing illustrates having the client application execute in a virtualized environment using VMs on both the host and data storage system. As a variation, for example, the application to be migrated may execute in a non-virtualized environment on the host and a virtualized environment on the data storage system.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing processing in a data storage system
   identifying a client application executing on a host as a candidate for migration to the data storage system, wherein first data used by the client application is stored on one or more physical storage devices of the data storage system;
   migrating the client application to the data storage system for temporary execution on the data storage system; and
   executing the client application on the data storage system for a time period using a first portion of resources of the data storage system allocated for exclusive use by migrated client applications executing on the data storage system, wherein the first portion of resources is dynamically determined and changes with respect to workload of the client application and workload of other tasks performed on the data age for non-migrated applications.

2. The method of claim 1, wherein the first portion of resources include any of a processor of the data storage system that executes code, memory of the data storage system, and an amount of bandwidth of an external communications port that communicates with the host.

3. The method of claim 1, further comprising:
   determining whether to migrate the client application in accordance with current utilization of one or more resources of the data storage system.

4. The method of claim 3, wherein the current utilization is utilization of a processor of the data storage system.

5. The method of claim 3, wherein the current utilization is utilization of memory.

6. The method of claim 3, wherein the current utilization is utilization of a component of the data storage system.

7. The method of claim 1, wherein the client application executes in a virtual machine in a virtualized environment on the host and also on the data storage system, said migrating including migrating a first virtual machine of the host to a second virtual machine of the data storage system.

8. The method of claim 1, further comprising determining whether to migrate the client application executing on the data storage system back to the host for execution on the host rather than the data storage system.

9. The method of claim 1, wherein the identifying, the migrating and the executing are performed automatically in response to a defined policy.

10. The method of claim 1, wherein, while the client application is executing on the data storage system, the client application accesses first data to perform an operation and sends a result of the operation to the host.

11. The method of claim 1, wherein the client application does not execute in a virtual machine of a virtualized environment on the host and does execute in a virtual machine of a virtualized environment on the data storage system.

12. A method for performing processing in a data storage system comprising:
   identifying a client executing on a host as a candidate for migration to the data storage system, wherein first data used by the client application is stored on one or more physical storage devices of the data storage system;
   migrating the client application to the data storage system for temporary execution on the data storage system; and
   executing the client application on the data storage systems for a time period using a first portion of resources of the data storage system allocated for exclusive use by migrated client applications executing on the data storage system, wherein the client application is identified using one or more criteria, the criteria including any of a ratio of an amount of data read for performing a first operation to an amount of data output as a result of performing the first operation on the data read, a ratio of an amount of time for the host to obtain data from the data storage system for performing an operation to an amount of time the client application takes to perform the operation on the obtained data, and whether the client application performs sequential data accesses of at least a specified size.

13. A method for performing processing in a data storage system comprising:
   identifying a client application executing on a host as a candidate for migration to the data storage system, wherein first data used by the client application is stored on one or more physical storage devices of the data storage system;

migrating the client application to the data storage system for temporary execution on the data storage system; and executing the client application on the data storage system for a time period using a first portion of resources of the data storage system allocated for exclusive use by migrated client applications executing on the data storage system, wherein the client application executes on any of a first processor of a front end adapter of the data storage system and a processor of a back end adapter of the data system, and wherein said front end adaptor communicates with components external with respect to the data storage system and receives I/O requests from the host and wherein said back end adapter directly accesses one or more physical storage devices in connection with performing data reads and writes for processing received I/O requests from the host.

14. The method of claim 13, wherein the client application executes on the first processor of the front end adapter and wherein the first portion of resources includes the first processor allocated for exclusive use by the migrated client applications and a portion of memory allocated for private exclusive use by the front end adapter, said first processor being one of a plurality of processors of the front end adapter.

15. A method for performing processing in a data storage system comprising:

identifying a client application executing on a host as a candidate for migration to the data storage system, wherein first data used by the client application is stored on one or more physical storage devices of the data storage system;

migrating the client application to the data storage system for temporary execution on the data storage system, and executing the client application on the data storage system for a time period using a first portion of resources of the data storage system allocated for exclusive use by migrated client applications executing on the data storage system, wherein the resources include memory of the data storage system and a first set of thresholds including a first minimum, first target and first maximum for the client application and a second set of thresholds including a second minimum, second target and second maximum for a second application that is not a migrated client application.

16. The method of claim 15, wherein the client application is allocated an amount of memory greater than said first target only if the second application is currently not allocated an amount of memory greater than the second target.

17. The method of claim 15, wherein the second application performs processing to service received I/O operations from the host or another external client connected to the data storage system.

18. A non-transitory computer readable medium comprising executable code store thereon for performing processing in a data storage system, the non-transitory computer readable medium comprising code that, when executed on a processor, performs a method comprising:

identifying a client application executing on a host as a candidate for migration to the data storage system, wherein first data used by the client application is stored on one or more physical storage devices of the data storage system;

migrating the client application to the data storage system for temporary execution on the data storage system; and executing the client application on the data storage system for a time period using a first portion of resources of the data storage system allocated for exclusive use by migrated client applications executing on the data storage system, wherein the first portion of resources is dynamically determined and, changes with respect to workload of the client application and workload of other tasks performed on the data storage system for non-migrated applications.

* * * * *